United States Patent Office 3,261,884
Patented July 19, 1966

3,261,884
ADHESIVE COMPOSITION COMPRISING A MIXTURE OF A POLYAMIDE AND A NOVOLAC RESIN
Bert S. Gorton, Wilmington, Del., assignor to E. I. du Pont de Nemours and Company, Wilmington, Del., a corporation of Delaware
No Drawing. Filed Jan. 2, 1963, Ser. No. 248,899
6 Claims. (Cl. 260—841)

This invention relates to adhesive compositions and structures having surfaces adhesively joined together therewith.

Adhesive compositions comprising a synthetic linear polyamide and a novolac are old in the art. A novolac is a phenolic-formaldehyde resin which is essentially linear and is thermoplastic. A general description of these novolac resins is provided by Wakeman, "The Chemistry of Commercial Plastics," Reinhold Publishing Corp., New York (1947), page 118.

The polyamides most commonly used heretofore in the prior art may be classified as the so-called "nylon-type" polyamides and the "fatty acid-type" polyamides. The nylon type polyamides are those formed by the condensation polymerization of a polyamine such as ethylene diamine, 1,4-diamino butane, hexamethylene diamine, and the like, with a polycarboxylic acid such as glutaric acid, adipic acid, pimelic acid, suberic acid, sebacic acid, and the like. All of the nylon-type polyamides have in common the presence of a plurality of recurring groups having the structure:

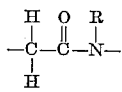

wherein R is hydrogen or an alkyl or alkoxy group having from 1 to about 4 carbon atoms. Many of these nylon-type polyamides are described in U.S.P. 2,071,253, U.S.P. 2,130,523, U.S.P. 2,130,948, and U.S.P. 2,285,009. The fatty acid-type polyamides are those prepared by the condensation polymerization of a polyamine with a polymeric fat acid produced from the polymerization of drying or semi-drying oils, such as soybean, linseed, tung, perilla, octicica, cottonseed, corn, tall, sunflower, safflower oils, and the like, or the free acids, or simple aliphatic alcohol esters of such acids. Such fatty acid-type polyamides are described in U.S.P. 2,450,940.

The polyamide-novolac compositions of the art have been used fairly extensively as adhesives, particularly as metal adhesives. That is, as adhesives for adhering one metal substrate to another metal substrate or to some other type of substrate such as wood, glass, leather, plastic and so forth. These compositions provide reasonably good bond strengths at room temperature and thus are satisfactory for some purposes. However, these compositions do not retain satisfactory bond strengths when the adhered substrates are subjected to elevated temperatures, especially when subjected to elevated temperatures in a moisture laden atmosphere or when directly contacted with hot or boiling water (which are both sometimes referred to as "hot-wet conditions").

For many applications it is essential to have an adhesive that will provide good bond strengths at elevated temperatures and under hot-wet conditions. For example, in the manufacture of metal containers for canning foodstuffs (the so-called "tin cans"), it is necessary to use a side-seam adhesive that will retain a satisfactory bond strength when the can is steam-sterilized. Another example is the provision of structural adhesives used in airplane construction, such as adhering wing surface metal to the structural frame, which will retain adequate bond strength under the high temperatures developed when the airplane is in super-sonic speed flight. Also in the manufacture of cookingware it is often convenient to use adhesives, for example to join handles onto pots and pans, but it is obvious that the adhesive used must withstand the temperatures encountered when such pots and pans are used in cooking. Also, there exists a need for an adhesive for use in the manufacture of internal combustion engines, whereby the engine block may be die cast in two pieces and these two sections adhesively joined together. Not only must the adhesive withstand the elevated temperatures developed by the engine in operation, but in a water cooled engine, the adhesive bond is subjected to hot-wet conditions. The polyamide-novolac adhesives of the prior art are wholly unsatisfactory for such applications.

An object of this invention is to provide improved polyamide-novolac adhesive compositions. Another object is to provide a polyamide-novolac adhesive composition which provides good bond strengths between metal substrates and which retains adequate bond strengths at elevated temperatures, and furthermore which will retain adequate bond strengths under hot-wet conditions. Other objects will be apparent from the following description of this invention.

These objects are attained by the composition comprising 65–99 parts by weight of a polyamide having the recurring group of the formula:

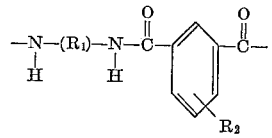

wherein $R_1$ is an alkylene radical having 2–16 carbon atoms and $R_2$ is a member of the group consisting of hydrogen, $C_1$–$C_5$ alkyl radicals and halogens, said polyamide having a molecular weight of 1,000–35,000, and 1–35 parts by weight of a novolac having a viscosity of 50–200,000 centipoises at 25° C.; not more than about 50% by weight of the phenolic constituent of the said novolac being substituted with an alkyl group containing more than 3 carbon atoms.

The polyamides of this invention may be prepared by the condensation polymerization of an alkylene diamine having 2–16 carbon atoms, such as hexamethylene diamine, tetramethylene diamine, decamethylene diamine, undecamethylene diamine, dodecamethylene diamine, hexadecamethylene diamine, ethylene diamine and so forth, with isophthalic acid or a $C_1$–$C_5$ alkyl or halogen substituted isophthalic acid such as 5-t-butyl-isophthalic acid or 5-chloro-isophthalic acid. The exact method of preparation is not critical. Thus any convenient procedure known in the art may be followed, for example, as shown in U.S. Patent No. 2,715,620.

It is essential that the polyamide used have a molecular weight within the range of about 1,000 to about 35,000. The bond strength obtained by the use of a polyamide having a molecular weight outside this range is too low to be of practical value. Furthermore, compositions derived from a polyamide having a molecular weight of less than about 1,000 do not possess adequate bond strength retention under hot-wet conditions. In addition, polyamides having molecular weights of more than about 35,000 do not readily mix with the novolacs of this invention and also compositions prepared from such polyamides require excessive time to form a bond between substrates. Therefore, in order to obtain practical bond strengths and the desired bond strength retention under elevated temperatures and hot-wet conditions it is necessary that the polyamide have a molecular weight that is within the aforesaid molecular weight range of about 1,000–35,000. Highest bond strengths are obtained by use of a polyamide having a molecular weight of about 5,000–15,000.

The novolacs of this invention are prepared by reacting formaldehyde with a phenolic compound such as phenol, m-cresol, resorcinol, naphthol, etc. or a mixture thereof, by any of the methods known in the art which produce a novolac, i.e., a phenolic-formaldehyde resin. Phenolic compounds which are substituted with long chain (over 3 carbon atoms) alkyl groups, such as nonyl phenol, markedly decrease the surface adhesion properties of the compositions of this invention. To obtain a composition which has practical utility, the phenolic portion of the novolac should be relatively free of long chain alkyl groups. Therefore, it is essential that not more than about 50% by weight of the phenolic constituent of the novolac be substituted with an alkyl group containing more than 3 carbon atoms, and it is preferred that none of phenolic constituent be substituted with such a long chain alkyl group. The preferred novolacs for use in this invention are those wherein the phenolic constituent is phenol.

It is also essential that the novolac be a syrup, that is, have a viscosity of from about 50 to 200,000 centipoises. The novolacs which have a viscosity of less than 50 centipoises at 25° C. have relatively low boiling points and thus are relatively volatile. Therefore, it is virtually impossible to use compositions prepared from such non-viscous novolacs as an adhesive between substrates wherein it is desirable to use heat to promote the reaction between the novolac and the polyamide. In addition, such compositions tend to flow readily when subjected to a combination of heat and pressure. Thus, they cannot be used to bond together structural joints since some of the novolac flows out from between the substrates leaving an insufficient amount to provide an adequate bond. Extremely viscous (i.e., over 200,000 centipoises at 25° C.) and solid novolacs are also unsuitable for use in this invention. Compositions prepared from these latter novolacs provide considerably lower bond strengths than do the novolacs which are syrups and furthermore, these novolacs impart an undesirable brittleness to the adhesive bond.

The polyamides and novolacs used in the practice of this invention should be blended together in the proportion of 65–99 parts by weight of polyamide and 1–35 parts by weight of novolac. Proportions outside of these specified ranges will result in compositions which do not possess bond strength retention at high temperatures and under hot-wet conditions.

The manner in which the polyamides and novolacs of this invention are blended together is not critical. The polyamide may be dissolved in a suitable solvent such as dimethylacetamide or dimethylformamide and the novolac may then be added to the solution and mixed therewith. This polyamide solvent may be used in an amount sufficient to form a paste which can be directly applied to the surfaces to be adhered, or enough solvent can be used to form a liquid composition. Ultimately, the polyamide solvent can be removed by any convenient method, e.g., precipitation, air drying, spray drying, etc. to obtain a powdered blend of the polyamide and novolac. The resultant powder may then be used to adhere surfaces together in the manner shown hereinbelow. Preferably, a fine powder of the polyamide is intimately mixed together with the novolac, without the use of a polyamide solvent. If desired, a suitable solvent for the novolac may be used to facilitate this mixing procedure, or sufficient novolac solvent may be used to form a paste. Suitable solvents for the novolacs of this invention include acetone, methanol, methyl ethyl ketone, and the like. The compositions of this invention may also be prepared in the physical form of a film or tape by any of the methods familiar in the art. Generally, higher bond strengths are obtained when the compositions are prepared by mixing the powdered polyamide and the novolac without the use of a polyamide solvent.

The compositions of this invention may be used as adhesives for many different types of materials such as wood and other cellulosic materials, leather, glass, plastics, and so forth. However, these compositions are primarily intended for use in adhering together metal substrates. These compositions can be used as adhesives for any metal including aluminum, magnesium, molybdenum, tungsten, iron, and the iron alloys such as the various steels, and the like. These compositions are particularly suitable for use as side-seam sealants for aluminum cans.

In practice of this invention, it is preferred to thoroughly clean or degrease the metal surface to be adhered and then etch the surface by treatment with acid prior to applying the adhesive composition. If the surfaces to be adhered together can be conveniently placed in a horizontal position, it is preferred to use a powder composition preferably prepared as mentioned above by mixing the polyamide and novolac together without the use of a polyamide solvent. Otherwise a film, tape or paste composition can be used. A relatively thin layer of the adhesive composition is applied to one of the surfaces. Then the other surface is placed into position and this assembly is pressed under a relatively light load (i.e., about 10 to 2,000 p.s.i.) at a temperature of about 350° F.–600° F. for sufficient time to complete the interaction of the polyamide and the novolac usually about 2–90 minutes. The metals thus joined are ready for use as desired. Other procedures for using the compositions of this invention will be obvious to those skilled in the art.

The following examples further illustrate preferred embodiments of this invention. In each of these examples, to provide correlative data, strips of 7075–T6 aluminum (Lyman, ed., Metals Handbook, vol. I, "Properties and Selection of Metals," American Society for Metals, Novelty, Ohio, 8th ed., 1961, page 948) are used as the metal substrates. These aluminum strips are 0.065 inch thick and measure 1 in. x 3 in. These strips are degreased by suspending them in trichloroethylene vapor. Following the degreasing, these strips are etched in a chromic acid bath at 70° C. for 30 minutes, washed in cool water and then dried. Standard lap joints are prepared by applying the various compositions shown onto the surface of one strip and then positioning another strip on top thereof to form a 0.5 inch overlap (ASTM D1002–53T). These lap joints are then pressed together with 200 p.s.i. pressure at 450° F. for the time indicated. The bond strengths of the various adhesive compositions are evaluated by determining the lap shear strengths of the prepared lap joints, in accordance with ASTM D1002–53T, whereby the strips are pulled apart at a rate of 0.2 in./min. at a jaw separation of 4½ inches. All of the lap shear strength values shown are the average of at least 3 trials.

*Example 1*

To 10 grams of dry powdered (100 mesh) poly(hexamethylene isophthalamide) having a molecular weight of 9,000 is added 3 grams of a commercially available syrupy novolac having the approximate formula of

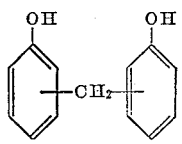

an average molecular weight of about 200, a boiling point of about 370° C., and a viscosity of about 1,500 centipoises at 25° C. These two components are ground together in a motar to obtain a good mixture. The resultant powder is used to prepare joints as described above. One group of joints are pressed for 3 minutes, then cooled and tested. The average lap shear strength of these joints at room temperature is 2,940 p.s.i. Another group of joints are pressed for 60 minutes, then cooled and tested. When tested at room temperature these latter joints have an average lap shear strength of 3,940 p.s.i.; the average lap shear strength at 50° C. is 4,010 p.s.i.; the average lap shear strength at 75° C. is 2,900 p.s.i.; the average lap shear strength at 100° C. is 1,900 p.s.i. When tested after being heated in a steam autoclave at 250° F. for one hour and then cooled to room temperature these latter joints have an average lap shear strength of 1,840 p.s.i.

*Example 2*

Example 1 is repeated using in place of the poly(hexamethylene isophthalamide) as shown therein, poly(hexamethylene 5-t-butyl-isophthalamide) having a molecular weight of 9,000. Similar results are obtained.

*Example 3*

Example 1 is repeated using in place of the poly(hexamethylene isophthalamide) as shown therein, poly(hexamethylene 5-chloro-isophthalamide) having a molecular weight of 9,000. Similar results are obtained.

*Example 4*

Example 1 is repeated using in place of the poly(hexamethylene isophthalamide) as shown therein, poly(decamethylene isophthalamide) having a molecular weight of 11,000. Similar results are obtained.

*Example 5*

Ten grams of poly(1,2-propylene isophthalamide) having a molecular weight of approximately 7,200 are blended together with 0.5 gram of the novolac used in Example 1. Joints are formed as shown above, pressing for 5 minutes at 505° F. The average room temperature lap shear strength of these joints is 1,580 p.s.i.

The following examples illustrate the results obtained by the use of novolacs which are not syrups, and by the use of novolacs wherein the phonolic constituent is substituted with a long chain alkyl group.

*Example 6*

Ten grams of the poly(hexamethylene isophthalamide) used in Example 1 are blended with 1 gram of a nonyl phenolformaldehyde novolac which is a solid resin having a molecular weight of about 1,000. Lap joints are prepared as shown above, pressing for 5 minutes at 505° F. The average lap shear strength is only 300 p.s.i. Furthermore, these joints are quite brittle.

*Example 7*

Example 6 is repeated using in place of the nonyl phenol-formaldehyde novolac shown therein, a syrupy liquid dodecyl phenol-formaldehyde novolac having a molecular weight of about 1,000. This composition forms brittle joints having an average lap shear strength of 300 p.s.i.

*Example 8*

Example 5 is repeated using in place of the novolac shown therein, 0.5 gram of the solid nonyl phenol-formaldehyde novolac used in Example 6. Lap joints prepared as described above have an average room temperature lap shear strength of only 800 p.s.i.

As shown in Examples 6–8 use of a novolac having either a viscosity greater than 200,000 centipoises or a long chain alkyl group substituted phenolic constituent give obviously inferior results as compared to the novolacs of this invention, and thus the extremely viscous and solid novolacs, and the novolacs wherein more than about 50% by weight of the phenolic constituent is substituted with an alkyl group containing more than 3 carbon atoms are not within the scope of this invention.

I claim:

1. A thermoplastic adhesive composition consisting essentially, per 100 parts by weight, of 65–99 parts by weight of a polyamide having the recurring group of the formula:

$$-N-(R_1)-N-\overset{O}{\underset{}{C}}-\underset{R_2}{\underset{|}{\bigcirc}}-\overset{O}{\underset{}{C}}-$$
$$\,\,\,\,\,\,\,\,\,\,\,\,\,\,\,\,\,\,H\,\,\,\,\,\,\,\,\,\,\,\,\,\,\,H$$

wherein $R_1$ is an alkylene radical having 2–16 carbon atoms and $R_2$ is a member of the group consisting of hydrogen, $C_1$–$C_5$ alkyl radicals, and halogens, said polyamide having a molecular weight of 1,000–35,000, and 1–35 parts by weight of a novolac having a viscosity of 50–200,000 centipoises at 25° C., not more than about 50% by weight of the phenolic constituent of the said novolac being substituted with an alkyl group containing more than 3 carbon atoms.

2. A thermoplastic adhesive composition consisting essentially, per 100 parts by weight, of 65–99 parts by weight of poly(hexamethylene isophthalamide) having a molecular weight of 5,000–15,000 and 1–35 parts by weight of a novolac having a viscosity of 50–200,000 centipoises at 25° C., not more than about 50% by weight of the phenolic constituent of the said novolac being substituted with an alkyl group containing more than 3 carbon atoms.

3. A thermoplastic adhesive composition consisting essentially, per 100 parts by weight, of 65–99 parts by weight of poly(hexamethylene 5-t-butyl-isophthalamide) having a molecular weight of 5,000–15,000 and 1–35 parts by weight of a novolac having a viscosity of 50–200,000 centipoises at 25° C. not more than about 50% by weight of the phenolic constituent of the said novolac being substituted with an alkyl group containing more than 3 carbon atoms.

4. A structure having two surfaces adhesively joined together with the composition of claim 1.

5. A structure having two surfaces adhesively joined together with the composition of claim 2.

6. A structure having two surfaces adhesively joined together with the composition of claim 3.

References Cited by the Examiner

UNITED STATES PATENTS

| | | | |
|---|---|---|---|
| 2,607,709 | 8/1952 | Simpson et al. | 260—841 |
| 2,715,620 | 8/1955 | Carlston et al. | 260—78 |
| 2,799,596 | 7/1957 | Frantz | 260—841 |

FOREIGN PATENTS

| | | |
|---|---|---|
| 520,575 | 1/1956 | Canada. |

MURRAY TILLMAN, *Primary Examiner.*

SAMUEL H. BLECH, *Examiner.*

J. C. BLEUTGE, *Assistant Examiner.*